Patented Apr. 6, 1937

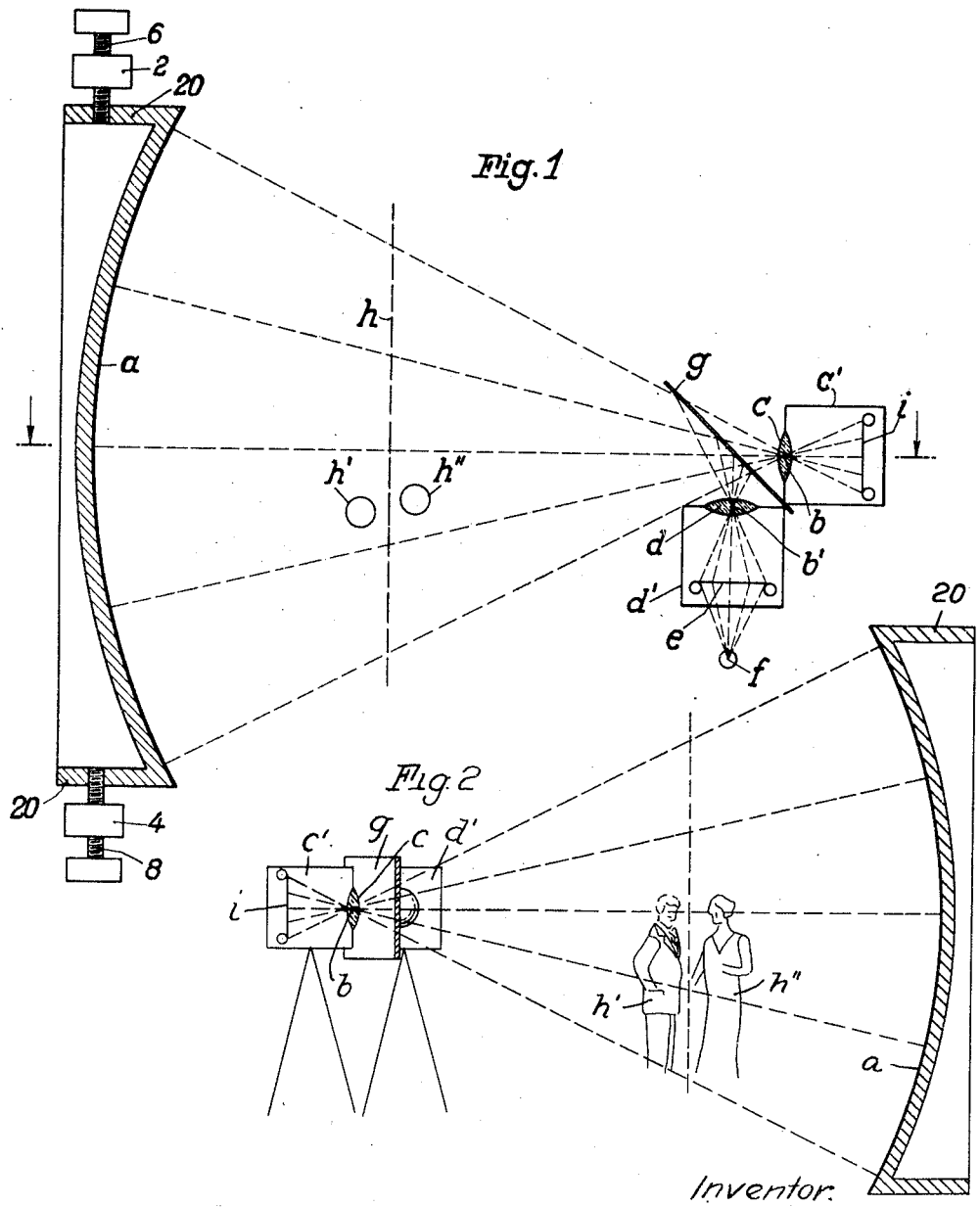

2,076,103

UNITED STATES PATENT OFFICE 2,076,103

APPARATUS FOR PRODUCING CINEMATOGRAPHIC COMBINATION FILMS

Walther Thorner, Berlin-Zehlendorf, Germany

Application May 15, 1933, Serial No. 671,161
In Germany May 18, 1932

2 Claims. (Cl. 88—16)

This invention relates to apparatus for producing cinematographic combination films.

One of the objects of the invention is to produce easily and with a minimum of light consumption, combination films by the use of a diapositive or a diapositive film, the result being perfect combination pictures, the picture obtained from the diapositive being just as rich in contrast effects as the scene which is photographed directly, so that the resulting finished film is of just as high a quality as though the whole had been photographed directly.

Another object of the invention relates to apparatus for carrying out my novel method, said apparatus comprising in combination a cinematographic exposure camera, a projecting apparatus, a semi-transparent semi-reflecting surface, a relatively large spherically curved concave mirror in front of which is to be located a scene to be photographed directly, for example the performing actors, the construction and arrangement being such as greatly to simplify the operation.

Other objects of the invention will appear in the course of the following description.

In operation a photographic or cinematographic exposure of one of the scenes to be combined is made and from this a diapositive or diapositive film is made which is placed in a projecting camera or apparatus. The other scene to be combined with the first referred to scene is set up in front of a photographic camera or is played by actors before said camera, and said projection apparatus, photographic camera and a positive producing optical system, preferably comprising a relatively large spherically curved concave mirror are so disposed and arranged with relation to the second scene that is to be directly photographed, that a picture of the lens of said projecting apparatus is projected upon the lens of the photographic camera, and the objects of said second scene to be directly photographed receive the light rays which emanate from those parts of the scene to be projected in front of which the said objects are to appear in the combination film, said light rays being thus, by the masking action of said objects, cut out of the light pencil which pictures said projected scene in the combination film upon the light sensitive layer in the camera.

This new arrangement, whereby a picture of the lens of said projecting apparatus is projected upon the lens of the photographic camera, has a result that the diapositive in the projection apparatus or the diapositive film fed through the latter is reproduced or pictured upon the light sensitive film in the photographic camera exactly as though the objects or the scene on said diapositive or diapositive film were photographed directly by said photographic camera.

The further feature above referred to, whereby the objects of the second scene, which is to be directly photographed, receive the light rays which emanate from those parts of the scene to be projected, in front of which said objects are to appear in the combination film, has the great advantage that the actors or objects of the second scene which is directly photographed receive and are illuminated by the light rays which emanate from those parts of the projected scene in front of which said objects or actors of said second scene either stand or move. My invention, therefore, eliminates entirely the use of masks or other devices hard to manipulate and heretofore used to prevent the objectionable superposition of the pictures of the two scenes to be combined.

If the second scene, as is usually the case, comprises scenes played by actors, so that the optical system must be relatively large, it is preferable to use a spherically curved concave mirror, which can be made relatively easily as a high degree of perfection as regards the optical characteristics is not necessary. The arrangement would preferably be such that between said concave mirror and its center of curvature a plane semi-transparent reflecting surface will be provided. The photographic camera and projecting apparatus will then preferably be so disposed and arranged that the optical center of the objective lens of one of them coincides with the center of curvature of said mirror. The axes of the lenses of the camera and projecting apparatus will be directed at an angle to each other in the same plane, and said plane semi-transparent reflecting surface will be in front of and between said two lenses and perpendicular to the plane of said two axes and halving the angle formed by said axes, the centers of said two lenses being spaced equal distances from the front face of said plane semi-transparent reflecting surface, said distances being measured along said axes. If the lens of the photographic camera is so disposed that the optical center of said lens coincides substantially with the center of curvature of said mirror the projection apparatus will be so positioned and arranged that the optical center of its objective lens shall coincide with that point which shall be optically the equivalent of the center of curvature in relation to the reflection at said plane reflecting surface. As rays emanating from the center of curvature of a spherically curved concave mirror are reflected back to said center of curvature, all projected light rays emanating from said projection apparatus, and which are reflected by said plane reflecting surface and pass through the latter after reflection from said concave mirror, will enter the photographic camera. In said photographic camera the diapositive picture will therefore be formed upon the film in precisely the same manner. The persons or objects of the main scene, however, receive also those light rays which emanate from those parts of the diapositive picture in front of which the actors or objects are to be located in the combined picture, whereby, as already stated, the necessity for covering masks is eliminated. It is true that the figures or objects of the main scene will be illuminated in front by the light rays coming from the projection objective lens and reflected by said plane surface. But the light which is thus caused to fall upon the actors or objects of the main scene is so weak that it can have no effect upon the light sensitive film in the photographic camera so that the combined picture cannot be injuriously affected thereby.

The invention and its various aims and objects will be readily understood from the following description, taken in connection with the accompanying drawing, of one illustrative embodiment of novel means for carrying out my novel method, the true scope of the invention being more particularly pointed out in the appended claims.

In the drawing:

Fig. 1 is a diagrammatic representation of one illustrative form of means for carrying out my novel method; and Fig. 2 is a diagrammatic representation of a longitudinal vertical section of the illustrative means represented in Fig. 1.

In said figures, a relatively large spherically curved concave mirror is shown at $a$, the center of curvature of said mirror being shown at $b$. It has been found that a mirror of about three meters in diameter will meet all ordinary requirements, but the diameter may vary according to circumstances. The object lens of the exposure camera is shown at $c$ and that of the projecting camera or apparatus is shown at $d$. Said cameras may be of any suitable conventional construction and are therefore shown only diagrammatically, all parts not necessary to the understanding of the present invention being omitted for the sake of clearness. A diapositive which may consist of a single picture or of a continuous film, is shown at $e$ and a light sensitive layer or film is indicated at $i$. The diapositive to be projected is illuminated by an incandescent bulb $f$. The exposure camera $c'$ and the projecting camera or apparatus $d'$ are separated from each other by a semi-transparent reflecting plane surface $g$ and in the illustrative embodiment of the invention herein shown their arrangement is such that the optical center of the objective lens $c$ of the exposure camera coincides with the center of curvature $b$ of said concave mirror $a$ and the optical center of the objective lens $d$ of the projecting apparatus $d'$ coincides with that point that is optically equivalent to the center of curvature in relation to the reflecting surface $g$. If the directly photographed scene includes actors the latter will perform in the vicinity of a plane indicated by $h$, the actors being indicated by $h'$, $h''$. The frame of the mirror is designated by 20.

The light emanating from the projection lens $d$ will be reflected by the mirror $g$, and except as and where it is intercepted by the actors $h'$, $h''$ and the other objects of the main scene $h$, will fall upon the concave mirror $a$, from which it is reflected along the same paths. The projected light rays reflected by the concave mirror $a$ and the light rays emanating from the actors $h'$, $h''$ and the other objects constituting the main scene pass simultaneously through the semi-transparent mirror $g$ and into the objective lens $c$, which combines the diapositive picture and the main scene $h$ (actors and/or other objects) into a single picture upon the light sensitive layer or film $i$. If the secondary scene, instead of consisting of a single diapositive picture should consist of a variably moved scene, so that a diapositive film, for example, is fed through the projection apparatus, it will be preferable to use a synchronized film feed for the exposure camera and the projection apparatus. Such synchronized film feeds are well known in the sound film art and any suitable conventional synchronized feed may be used in conjunction with the present invention so that any further description thereof would appear to be superfluous.

The spherically curved concave mirror $a$ may be supported in any suitable manner and by any suitable means, the supporting means herein used conveniently comprising two vertical standards 2 and 4 provided with clamping screws 6 and 8 between which the mirror is firmly clamped, as shown in Fig. 1.

The mirror $a$ may be made in a single piece with a single reflecting surface. Such a construction, however, involves considerable expense in a mirror having a diameter of substantially three meters and if desired the mirror may therefore be made up of a large number of small mirrors each having its own reflecting surface.

In methods heretofore used for combining into a single film picture a diapositive of a landscape, buildings or film scenes and an actually active scene by actors or any other scene, the great difficulty has been to avoid the objectionable superposition of one of the depicted scenes upon the other. To avoid this masks have been used which are interposed so as to cut off certain rays. Such means, however, are not only unsatisfactory as regards the result obtained, but their construction and manipulation are difficult and awkward. It has also been proposed to use for this purpose lights of complementary colors for illuminating the two scenes to be combined, for example the background and the actors. Such expedients, however, call for a disproportionately strong illumination and an extraordinarily great expenditure of lighting current, on account of the great absorption of light by the color filters used. It has also been proposed to project a landscape or other background diapositive or a film scene upon an ordinary screen by means of a diapositive film, and cause the actors to perform in front of said screen. Apart from the fact that this procedure entails a very great light consumption it is open to the further objection that the picture made from the projected scene is greatly lacking in contrast effects in comparison to the directly photographed scene. Such processes also require the projected scenes to be at a relatively great distance from the location of the main scene, for the reason that the projected scenes must under no circumstances be noticeably illuminated by the light used for illuminating the main scene and particularly the actors. It is therefore necessary in such processes to use ground glass plates up to six meters or even more in diameter in making the projected scene.

The present invention is free from all of the objectionable features of the above mentioned known methods and produces combination pictures of a very high degree of perfection and in which that part of the combination picture produced from the diapositive or diapositive film is quite as rich in contrast effects as that part of the picture produced from the directly photographed scene, and this with a minimum light consumption, the resulting combination picture or film being of uniform quality throughout, the same as if the entire picture had been directly photographed. The execution of my novel method is very simple and readily carried out and the apparatus used in carrying out said method is very simple in construction and arrangement and is extremely reliable in operation.

I am aware that my invention may be embodied in other specific forms without departing from its spirit or the essential attributes thereof, and I therefore desire the present embodiment to be considered in all respects as illustrative and not restrictive, reference being had to the appended claims rather than to the foregoing description to indicate the scope of the invention.

I claim:

1. Apparatus for making combination photographs or cinematographic films comprising two scenes, said apparatus comprising, in combination, a photographic camera including an objective lens and light sensitive layer supporting means; a projecting apparatus including an objective lens, the axes of said two lenses being directed at an angle to each other in the same plane; a spherically curved concave mirror of relatively large diameter having its center of curvature substantially coincident with the optical center of the lens of said photographic camera the axis of said camera lens coinciding with that of said mirror; a scene located between said concave mirror and the lens of said photographic camera to be directly photographed by the latter; a plane semi-transparent reflecting surface positioned in front of and between said two lenses perpendicularly to the plane of the axes of said two lenses and halving the angle formed by said axes, the centers of said two lenses being spaced equal distances from the front face of said plane semi-transparent reflecting surface, said distances being measured along said lens axes.

2. Apparatus for making combination photographs or cinematographic films comprising two scenes, said apparatus comprising, in combination a photographic camera including an objective lens and light sensitive layer supporting means; a projecting apparatus including an objective lens, the axes of said two lenses being directed at an angle to each other in the same plane; a spherically curved concave mirror of relatively large diameter facing the lens of said camera and having its center of curvature substantially coincident with the optical center of one of said lenses the axes of said camera lens and of said mirror coinciding; and a plane semi-transparent reflecting surface positioned in front of and between said two lenses perpendicularly to the plane of the axes of said two lenses and halving the angle formed by said axes, the centers of said two lenses being spaced equal distances from the front face of said plane semi-transparent reflecting surface, said distances being measured along said lens axes.

WALTHER THORNER.